May 17, 1966 R. E. LATTA ETAL 3,251,337

SPIRAL FLUIDIZED BED DEVICE AND METHOD FOR COATING PARTICLES

Filed July 16, 1963

INVENTORS.
Robert E. Latta
Earl S. Funston
BY
Roland A. Anderson
ATTORNEY.

United States Patent Office 3,251,337

Patented May 17, 1966

1

3,251,337
SPIRAL FLUIDIZED BED DEVICE AND METHOD FOR COATING PARTICLES

Robert E. Latta, Maineville, and Earl S. Funston, Fairfield, Ohio, assignors to the United States of America as represented by the United States Atomic Energy Commission Filed July 16, 1963, Ser. No. 295,572
3 Claims. (Cl. 118—48)

This invention relates generally to fluidization devices and more particularly to a spiral bed fluid-solid contacting device and methods of effecting fluid-solid contacting utilizing this device.

In the preparation of nuclear reactor fuel materials, such as those containing solid refractory particles of uranium dioxide, thorium dioxide, uranium carbide or zirconium dioxide, it is often necessary to coat the discrete particles with a relatively thin metallic or ceramic coating. These coated particles are useful as fuel elements, such as in a suspension of fluidized system, or they may be fabricated with other materials into conventional type fuel elements. The particle coatings provide various physical and nuclear property improvements, among them increased fission product retention, improved oxidation and abrasion resistance of the particles, improved strength and uniformity of dispersions, and prevention of reaction between the nuclear fuel and other reactor system components.

Previously, conventional fluid-solid contacting devices have been used for fluidization and maintenance of particle separation while coating layers are being deposited on the discrete particles. In these conventional devices, fluidizing and/or reacting gases usually enter the particle bed from the center of the bottom of a conically shaped section that changes into cylindrically shaped contacting section. The finely divided particles in the bed are lifted vertically and agitated by the rising gases, thereby separating the discrete particles by smooth agitation and permitting a coating process to take place. However, when particle separation is lost during the coating operation, the coating may bridge between two or more particles or the coating gases may tend to pass around groups of particles, thereby coating the agglomerate rather than individual particles.

As long as the particles mass is large enough, a sufficiently high velocity can be given to the entering gas to maintain good fluidization with consequent particle separation and adequate coating, but as the particle mass becomes smaller (i.e., small particle size), the gas velocity has to be lowered to prevent suspension and removal of the bed. When a sufficiently low gas velocity is reached, the smooth gas flow breaks up and passes through the bed as bubbles, forms a cone in the middle of the bed, or passes through the bed in a slugging action, thereby causing loss of separation of the particles with concurrent loss of ability to coat discrete particles.

The conventional fluid-solid contacting devices hereinabove described have a lower useful limit of about 50 micron particle size, particularly with particles such as the refractory particles for nuclear fuels, since at this particle size the gas velocity required for particle fluidization and separation will also cause suspension resulting in removal of the particle bed. Also, in conventional devices, as bed and/or gas temperature is increased to produce a desired chemical coating reaction, the lower useful limit of the particle size increases to about 100 microns at approximately 1000° C. Since it is often desirable to coat refractory particles for nuclear fuels at temperature above 900° C., the conventional fluid-solid contacting devices are inadequate for particle sizes below

2

100 microns. Therefore, previous attempts to extend the particle size range of fluidization in conventional devices below about 50 microns in diameter have been unsuccessful and upon heating the fluidized bed, fluidization of these fine particles is lost and sintering takes place with loss of ability to coat the discrete particles.

The term "refractory" as used herein is used in its usual sense to refer to materials which will resist change of shape, weight or physical properties at elevated temperatures and is herein intended to include metals as well as metal oxides and metal carbides.

It is accordingly an object of this invention to provide a fluid-solid contacting device for fluidizing particles in the range 10 to 100 microns in diameter.

It is another object of this invention to provide a fluid-solid contacting device for fluidizing particles below 100 microns in diameter at elevated temperatures.

It is another object of this invention to provide a fluid-solid contacting device for contacting discrete particles with a spiral fluidizing stream.

Another object of this invention is to provide a device for coating discrete particles in the range 10 to 100 microns in diameter at elevated temperatures.

Still another object of this invention is to provide an improved device and method for coating discrete refractory nuclear fuel particles.

These and other objects of this invention are accomplished by providing a spiral bed fluid-solid contacting device comprising a contacting chamber of inverted frustoconical configuration provided with at least one fluid inlet port disposed tangentially to the wall of said contacting chamber at the narrow lower portion or bottom of said chamber. Either a conical projection or a cylindrical member is axially disposed in the bottom of the contacting chamber to impart and maintain an upward spiral motion to the entering fluid and to deflect particles entering the low pressure center region back into the spiralling fluid stream.

By having the fluid enter tangentially to the frustoconical contacting chamber an increase in particle velocity imparts a circular spiralling motion to the bed of fine particles and this motion may be maintained by the provision of the conical projection or cylindrical member axially disposed in the lower portion of the chamber. Thus, a higher particle velocity than would be possible in a conventional fluid-solid contacting device is achieved which results in increased kinetic energy of the particles. Increased kinetic energy provides better particle separation, prevents particle sintering, and agglomeration even at elevated temperatures.

This novel spiral bed contacting device is particularly useful for coating, in a fluidized state, discrete refractory particles, such as those used in the manufacture of nuclear reactor fuels, having an average diameter of 10 to 100 microns at temperatures ranging from 900° C. to 1400° C. These fine discrete particles may be coated under these conditions without loss of fluidization or coating ability due to agglomeration or sintering of the particles as would occur using a conventional fluidized bed.

The invention will be more fully understood by reference to the following detailed description of certain preferred embodiments and the appended drawings, in which.

Figures 1, 2, 3:
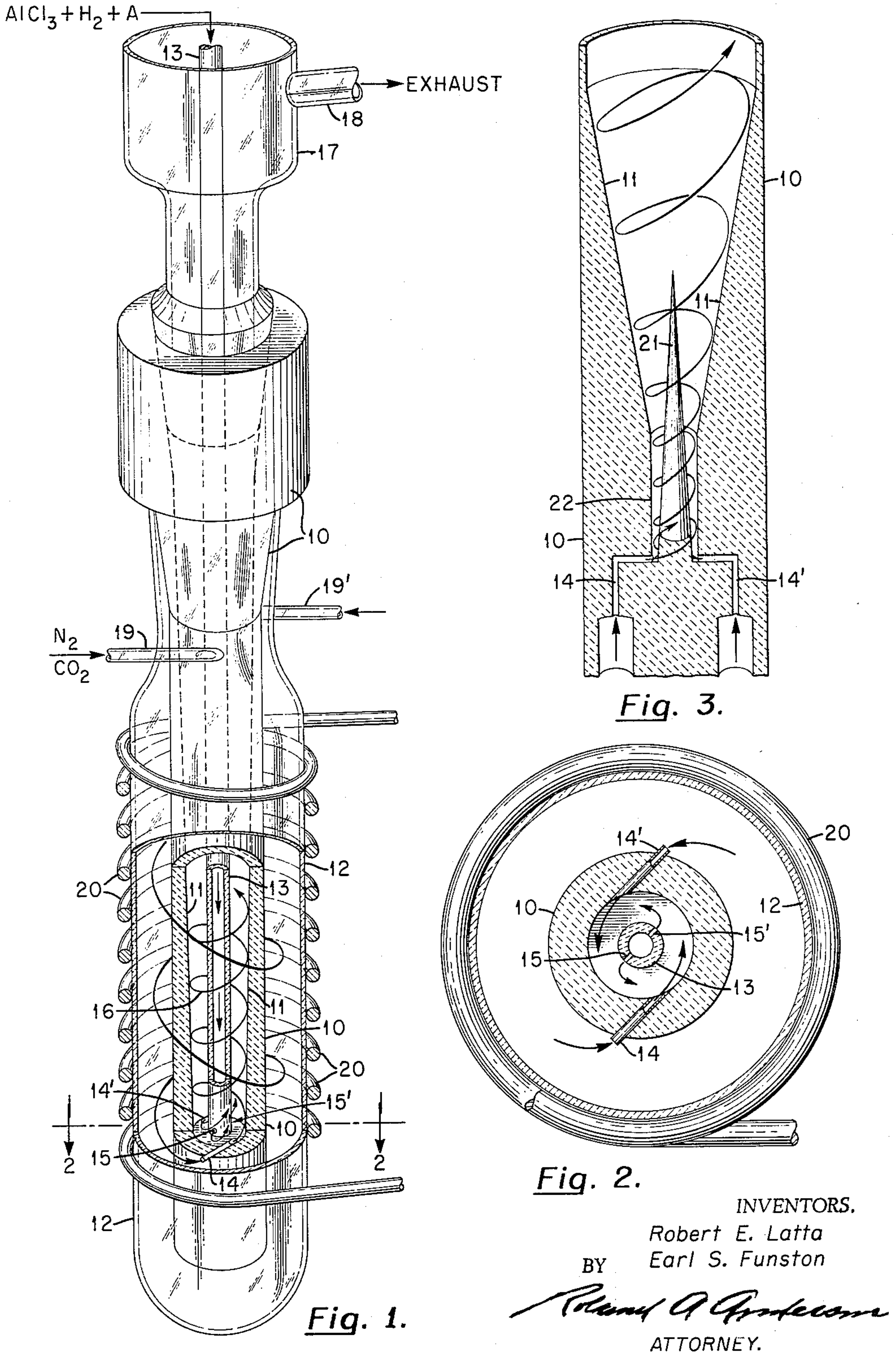
FIG. 1 is a sectional view in perspective of a preferred embodiment of the fluid-solid contacting device showing the flow pattern of the spiral bed.
FIG. 2 is a cross sectional view taken along 2—2 of FIG. 1 showing the circular cross section of the contacting device with the tangential gas inlet ports.
FIG. 3 is a sectional view in perspective of another embodiment of the spiral bed fluid-solid contacting device.

Referring to the preferred embodiment of this invention illustrated in FIG. 1 and FIG. 2, the fluid-solid contacting device 10 is shown disposed within a gas preheater vessel 12 which serves as both an induction furnace to heat the contacting device 10 and as a preheating system for one of the gas streams. The contacting device 10 in this embodiment comprises a reaction or contacting chamber 11 and a hollow cylindrical member 13. This contacting device may be fabricated from any material capable of withstanding the temperatures and reactions desired, but it is preferably machined from graphite. The contacting chamber 11 is fabricated in the shape of an inverted frustum of a cone with the narrower bottom portion closed and with the wider upper portion open and in mating relationship with gas exhaust vessel 17. At or near the bottom of the contacting chamber 11, two gas inlet ports 14, 14' are disposed tangentially to the walls of the chamber and in communication with the gas preheater vessel 12. Hollow cylindrical member 13, disposed axially in the contacting chamber 11, extends upward from the bottom of the chamber 11 through the open upper portion into the gas exhaust vessel 17 where it is in communication with a second gas production and preheating source (not shown in the drawings). Gas passageways 15, 15' are provided near the bottom of the hollow cylindrical member 13 in communication with the bottom portion of the contacting chamber 11.

The gas preheater vessel 12, preferably fabricated from glass, such as Corning Glass Work "Vycor," with a low coefficient of thermal expansion, is open at the top to accept the contacting device 10 and is provided, near the open end, with two preheater gas inlet ports 19, 19' to admit one of the gas streams into the annular region between the gas preheater vessel 12 and the contacting device 10. Surrounding the gas preheater vessel 12 is in induction heater coil 20 connected to an electrical source.

Disposed above and in mating relationship with the contacting device 10 is a gas exhaust vessel 17 having a gas outlet port 18 to exhaust gases from the contacting chamber 11. Also, in this embodiment, but not shown in the drawings, is a second gas production and preheater chamber disposed within the gas exhaust vessel 17. As previously noted, hollow cylindrical member 13 extends into the gas exhaust vessel 17 and is in communication with this second gas production and preheater chamber.

In operation of the preferred embodiment herein described, the particulate solids to be fluidized are placed in contacting chamber 11 to form a bed. Induction heater coil 20 is connected to an electrical source to raise the temperature of the contacting device to a desired contacting temperature and to preheat the incoming fluidizing gas. Fluidizing gas is then introduced into the preheater gas inlet ports 19, 19', which are disposed tangentially to the wall of the gas preheater vessel 12, to initiate a spiral motion to the entering gas. By directing the flow of incoming gas downward in a spiral motion into annular region between the gas preheater vessel 17 and the contacting device 10, the entering gas is heated prior to entering the contacting chamber 11 while at the same time the gas cools the preheater vessel 12. Heated gas from the preheater vessel enters the contacting chamber 11 through gas inlet ports 14, 14'. The tangential placement of these ports and the slope of the contacting chamber walls initiate a circular spiral motion to the entering fluidizing gas. This motion is imparted to the bed of fine particles so that they spiral upward in the gas stream path 16 along the slope of the contacting chamber walls. After reaching a desired height, determined by the size, density and shape of the particles, the velocity and density of the entering gases and the slope of the contacting chamber walls, the spiralling particles fall into the low pressure center region adjacent the hollow cylindrical member 13 and are deflected back into the spiralling stream path 16.

A second preheated gas is introduced through the hollow cylindrical member 13 and enters the contacting chamber 11 by way of gas passageways 15, 15'. A separate gas preheating and inlet is often necessary where the gases being used in a coating process may tend to react prematurely and result in inadequate particle coating. After contact or reaction with the spiralling particles the gas stream flows upward into the gas exhaust vessel 17 and is exhausted through the gas outlet port 18.

Although exact dimensions of this contacting device are not critical and will depend on several factors, such as particle size and density, and the velocity of gases entering the contacting chamber, some dimensions of the preferred embodiment may be useful in the practice of this invention.

In the preferred embodiment the length of the contacting chamber 11 is about 16 inches from the bottom of the inside to the gas exhaust vessel 17 and the slope of the walls of the contacting chamber 11 is about 1 to 10; however, the slope is not critical and slopes as low as 1 to 5 have been used satisfactorily. The difference between the inside diameter at the bottom of the contacting chamber 11 (about ¾ inch) and the outside diameter of the hollow cylindrical member 13 (about ½ inch) is adjusted so that gases entering gas inlet ports 14, 14' are forced to maintain a high initial velocity as they spiral upward for at least the first inch of contacting. This difference of about ¼ inch is satisfactory for the particles and coating conditions herein described, but with larger volumes of gases entering through ports 14, 14' this difference may be increased. The inside diameter of the wider upper portion of the contacting chamber 11 will depend on the slope of the chamber walls and should be large enough so that gas velocity remains low in this region to prevent loss of fine particles from the chamber.

Another embodiment of the fluid-solid contacting device 10 is shown in FIG. 3. In this embodiment an axially disposed conical particle-deflecting projection 21 is substituted for the hollow cylindrical member 13 and the contacting chamber 11 has a cylindrical lower portion 22 provided with gas inlet ports 14, 14' disposed tangentially to the walls of the lower portion 22. Although this cylindrical lower portion 22 is not required to achieve the spiral path initiated by the tangential gas inlet ports 14, 14', it allows a gradual transition to a lower velocity of gases, thereby preventing loss of fine particles from the coating chamber. If it is necessary, this embodiment, to introduce more than one separate gas stream, such as in a case where it is undesirable for the gases to react prior to entering the contacting chamber, separate streams may be preheated and introduced at separate tangential gas inlet ports.

Small diameter refractory particles for use in nuclear fuel, particularly in the average particle diameter range from 10 to 100 microns, may be coated in the contacting chamber of the invention herein described. These particles are often coated with a metallic oxide deposit, such as $Al_2O_3$, by a vapor reaction coating process. The coating metallic oxide is produced in the contacting chamber by the reaction of a metallic chloride with water vapor at elevated temperatures. Water vapor used in said reaction can be produced by the reaction of hydrogen gas and carbon dioxide, also at elevated temperatures. In the preferred embodiment of the spiral bed contacting device the reacting gases are introduced into the contacting chamber by separate paths, as previously described. Preheated metallic chloride is introduced with hydrogen and, if necessary, diluent gases through the hollow cylindrical member 13 and enters the contacting chamber 11 by way of gas passageways 15, 15'. Carbon dioxide gas with a diluent gas is preheated in the gas preheater vessel 17 and enters the contacting chamber 11 through tangential gas inlet ports 14, 14' to create the spiral fluidizing motion as well as initiate the coating reactions described above. An optimum coating temperature range of 900° C. to 1400° C. is maintained in the contacting device by means of the induction heater coil 20. The time required for the metallic coating process is not crtical and depends on the temperature and the thickness of coating required.

This metallic coating process utilizing our invention will be further illustrated by referring to the following example.

*Example*

Four runs of approximately 25 gram batches of uranium dioxide containing nuclear fuel particles in size ranges from 37 to 53 microns were fluidized and coated in the spiral bed contacting device. A first gas stream preheated to 600° C. comprising aluminum chloride at a flow rate of 300 mg./min., hydrogen at a flow rate of 1.0 l./min., and argon at a flow rate of 0.15 l./min. was introduced through the hollow cylindrical member into the contacting chamber at one atmosphere of pressure. A fluidizing gas stream comprising a carbon dioxide at a flow rate of 0.4 l./min. and nitrogen at a flow rate of 2.0 l./min. was introduced tangentially to the chamber walls. The results of these combined fluidizing and coating runs are shown in the following table:

| Run No. | Uranium Dioxide Particle Size, microns | Approx. Bed Temp., ° C. | Coating Time, Hrs. | Average $Al_2O_3$ Coating Thickness, Microns |
|---|---|---|---|---|
| 1 | 44–53 | 1,000 | 4 | 5 |
| 2 | 37–44 | 1,100 | 2 | 1 |
| 3 | 44–53 | 1,100 | 3 | 2 |
| 4 | 37–44 | 1,000 | 4 | 2 |

Fluidizing the particles under the indicated conditions and temperatures yielded good quality uniform coatings of $Al_2O_3$ without loss of fluidization due to sintering or agglomeration of the fine particles.

It will be understood that the above example and embodiments are merely illustrative and are not intended to limit the scope of our invention, which is limited only as indicated in the appended claims. Further, variations in apparatus and procedure may be employed by one skilled in the art without departing from the scope of our invention.

What is claimed is:

1. A device for contacting solid particles with a gas stream which comprises:
   (a) a gas-preheater vessel,
   (b) a chamber of inverted frusto-conical configuration adapted to hold solid particles disposed concentrically within said gas-preheater vessel,
   (c) at least one gas inlet port disposed tangentially to the wall of said preheater vessel intermediate the ends of said vessel for passage of fluidizing gas downwardly along the annulus between said vessel and said chamber,
   (d) a hollow member axially disposed in said chamber extending upward from the bottom of said chamber and terminating in the upper section of said preheater vessel, said member being adapted to receive at its upper end a coating gas for passage therethrough and having its lower end terminate at the bottom of said chamber,
   (e) at least one gas port disposed within the wall of said hollow member spaced immediately above the lower terminating end of said member for passage of said coating gas into the annulus between said member and said chamber,
   (f) heating means disposed about the periphery of said preheater vessel, and
   (g) gas outlet means disposed at the upper end of said preheater vessel communicating with said annulus between said hollow member and said chamber for passage of exhaust gas from the reaction zone of said chamber.

2. Apparatus of claim 1 wherein said hollow member comprises a hollow cylindrical tube.

3. A device for contacting solid particles with a gas stream which comprises:
   (a) a gas-preheater vessel,
   (b) a chamber of inverted frusto-conical configuration adapted to hold solid particles disposed concentrically within said gas-preheater vessel,
   (c) at least one gas inlet port disposed tangentially to the wall of said preheater vessel intermediate the ends of said vessel for passage of fluidizing gas downwardly along the annulus between said vessel and said chamber,
   (d) an axially disposed conical particle-deflecting projection extending part way into said chamber and having at least one tangential gas inlet communicating with the lower section of said chamber,
   (e) heating means disposed about the periphery of said preheater vessel, and
   (f) gas outlet means disposed at the upper end of said preheater vessel communicating with said annulus between said conical particle-deflecting projection and said chamber for passage of exhaust gas from the reaction zone of said chamber.

References Cited by the Examiner

UNITED STATES PATENTS

| | | | |
|---|---|---|---|
| 1,546,922 | 7/1925 | Faber. | |
| 2,316,207 | 4/1943 | Winter | 34—57 X |
| 2,363,281 | 11/1944 | Arnold | 34—57 X |
| 2,581,134 | 1/1952 | Odell | 34—57 X |
| 2,696,677 | 12/1954 | Molenaar | 34—57 X |
| 2,743,196 | 4/1956 | Robinson | 117—100 X |
| 2,767,289 | 10/1956 | Robinson | 117—100 X |
| 2,924,887 | 2/1960 | Marshall | 34—57 |
| 3,012,876 | 12/1961 | Eaton et al. | 117—100 X |
| 3,020,646 | 2/1962 | Joseph et al. | 34—10 |
| 3,112,220 | 11/1963 | Heiser et al. | 117—100 |
| 3,122,595 | 2/1964 | Oxley | 117—100 X |
| 3,140,862 | 7/1964 | Schoppe | 34—57 |
| 3,165,422 | 1/1965 | Stoughton et al. | 117—100 |
| 3,175,922 | 3/1965 | Blocker et al. | 117—100 |

WILLIAM D. MARTIN, *Primary Examiner.*

G. L. HUBBARD, *Assistant Examiner.*